United States Patent
Goto

(10) Patent No.: US 7,681,167 B2
(45) Date of Patent: Mar. 16, 2010

(54) SYSTEM AND APPARATUS FOR DESIGNING LAYOUT OF A LSI

(75) Inventor: Takashi Goto, Tokyo (JP)

(73) Assignee: NEC Corporation, Tokyo (JP)

( * ) Notice: Subject to any disclaimer, the term of this patent is extended or adjusted under 35 U.S.C. 154(b) by 406 days.

(21) Appl. No.: 11/723,320

(22) Filed: Mar. 19, 2007

(65) Prior Publication Data

US 2007/0220473 A1    Sep. 20, 2007

(30) Foreign Application Priority Data

Mar. 20, 2006    (JP)    .............................. 2006-076787

(51) Int. Cl.
*G06F 17/50*    (2006.01)
(52) U.S. Cl. ..................... 716/11; 716/2; 716/5; 716/6; 716/12; 716/17
(58) Field of Classification Search ................. 716/4–6, 716/9–12, 17–18, 2
See application file for complete search history.

(56) References Cited

U.S. PATENT DOCUMENTS

| | | | | |
|---|---|---|---|---|
| 5,801,960 A | * | 9/1998 | Takano et al. | 716/10 |
| 6,415,426 B1 | * | 7/2002 | Chang et al. | 716/9 |
| 6,691,293 B2 | * | 2/2004 | Kanazawa | 716/11 |
| 2005/0034091 A1 | * | 2/2005 | Harn | 716/6 |

FOREIGN PATENT DOCUMENTS

JP    11-67925    3/1999

* cited by examiner

*Primary Examiner*—Paul Dinh
(74) *Attorney, Agent, or Firm*—McGinn IP Law Group PLLC

(57) ABSTRACT

A judgment section determines whether or not a reduction in the power dissipation is possible by relocation of an improvement-target cell. If a reduction in the power dissipation is possible, a calculation section calculates the delay time of a target path including the improvement-target cell to obtain a possible shift distance of the improvement-target cell, within which the timing constraint is satisfied. A layout change section relocates the improvement-target cell within a range in which the power dissipation can be reduced and timing constraint can be satisfied.

31 Claims, 10 Drawing Sheets

FIG. 3
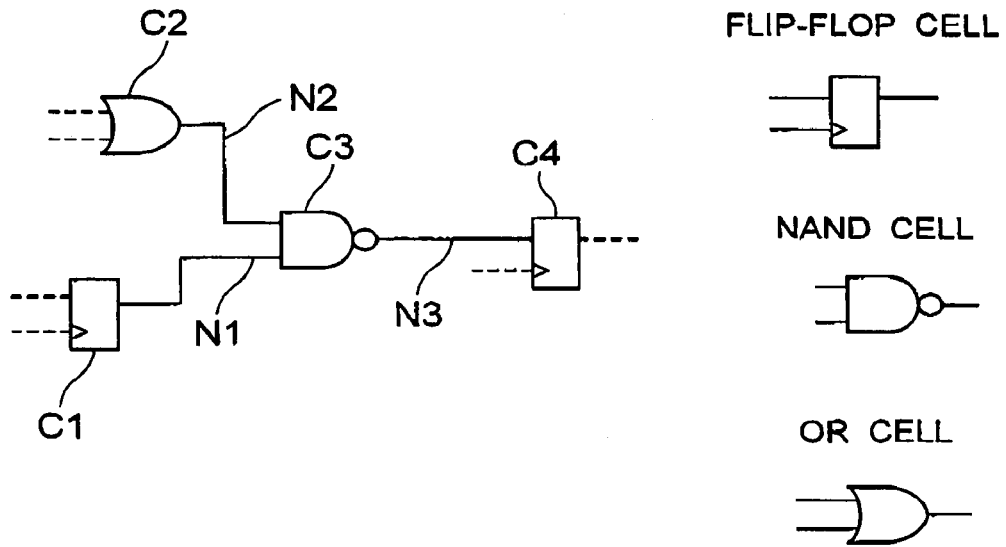
FIG. 4A
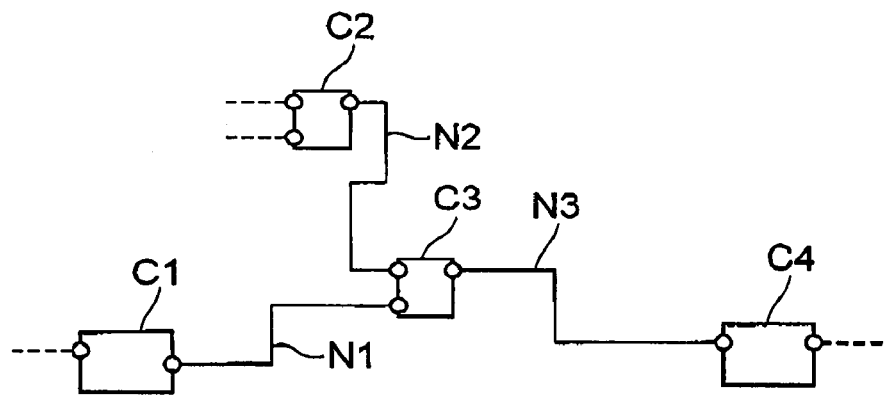
FIG. 4B
|  | INTERCONNECT LENGTH |
|---|---|
| N1 | 10 |
| N2 | 14 |
| N3 | 10 |

|  | TIME INTERVAL S1 | TIME INTERVAL S2 | TIME INTERVAL S3 |
|---|---|---|---|
| A1 | 0.5 | 0 | 0.5 |
| A2 | 0 | 1 | 01 |
| A3 | 0 | 0 | 0 |

|  |  | CELL DELAY | RESISTANCE | POWER DISSIPATION |
|---|---|---|---|---|
| FLIP-FLOP CELL | | 10 | 2 | 0.5 |
| NAND CELL | | 10 | 2 | 0.5 |
| OR CELL | | 10 | 1 | 0.5 |
| REPEATER CELL | | 10 | 1 | 0.5 |

| RESISTANCE PER UNIT LENGTH (R1) | 1 |
|---|---|
| CAPACITANCE PER UNIT LENGTH (C1) | 1 |

| K1 | 2 |
|---|---|
| K2 | 1 |

FIG. 7A

|  | TIME INTERVAL S1 | TIME INTERVAL S2 | TIME INTERVAL S3 |
|---|---|---|---|
| PN1 | 2.5 | 0 | 2.5 |
| PN2 | 0 | 7 | 0 |
| PN3 | 0 | 0 | 0 |

FIG. 7B

|  | TIME INTERVAL S1 | TIME INTERVAL S2 | TIME INTERVAL S3 |
|---|---|---|---|
| CELL POWER DISSIPATION | 2 | 2 | 2 |
| NET POWER DISSIPATION | 2.5 | 7 | 2.5 |
| TOTAL POWER DISSIPATION | 4.5 | 9 | 4.5 |

FIG.12
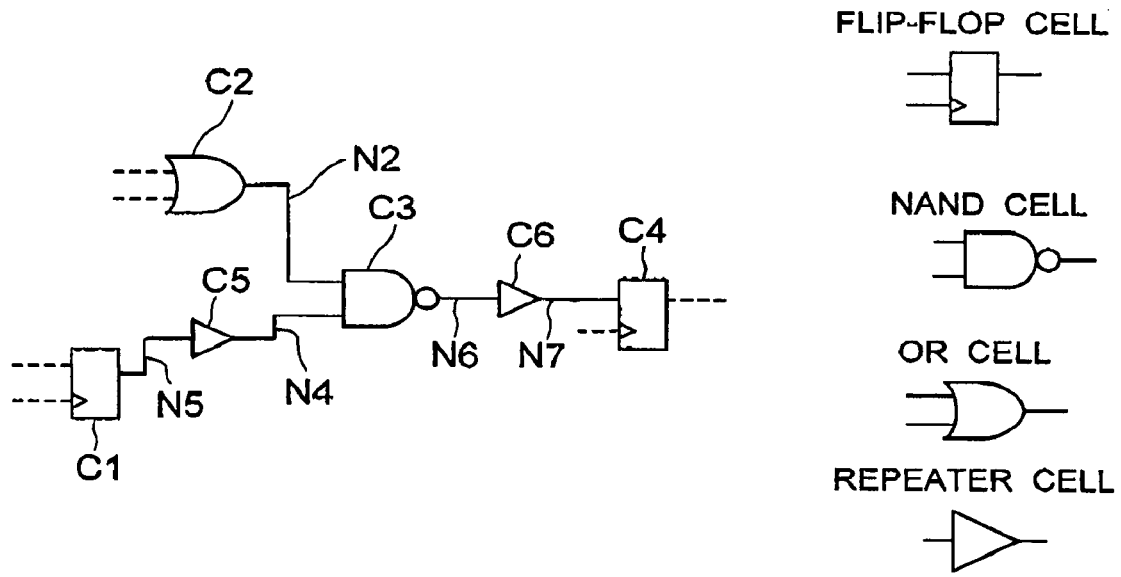
FIG.13A
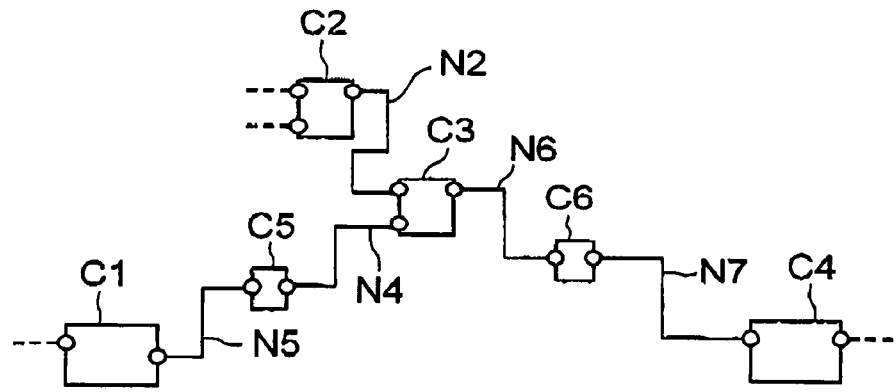
FIG.13B
|    | INTERCONNECT LENGTH |
|----|----|
| N2 | 10 |
| N4 | 7  |
| N5 | 7  |
| N6 | 7  |
| N7 | 7  |

TARGET CELL

| | TIME INTERVAL S1 | TIME INTERVAL S2 | TIME INTERVAL S3 |
|---|---|---|---|
| N4 | 1.75 | 0 | 1.75 |
| N5 | 1.75 | 0 | 1.75 |
| N2 | 0 | 5.5 | 0 |
| N6 | 0 | 0 | 0 |
| N7 | 0 | 0 | 0 |

| | TIME INTERVAL S1 | TIME INTERVAL S2 | TIME INTERVAL S3 |
|---|---|---|---|
| CELL POWER DISSIPATION | 3 | 3 | 3 |
| NET POWER DISSIPATION | 3.5 | 5 | 3.5 |
| TOTAL POWER DISSIPATION | 6.5 | 8 | 6.5 | ns
SYSTEM AND APPARATUS FOR DESIGNING LAYOUT OF A LSI

BACKGROUND OF THE INVENTION

1. Field of the Invention

The present invention relates to a system and an apparatus for designing layout of a LSI (large-scale-integrated circuit).

2. Description of the Related Art

A computer-aided design (CAD) system is often used in designing a semiconductor device such as a LSI. In the designing process using the CAD system, automatic layout design is performed based on the arrangement of circuits or information concerning connection between circuits to thereby determine the positions of respective circuits or interconnection route between circuits on the semiconductor device. After completion of the layout design, verification is made to ascertain whether or not the timing constraint between circuits is satisfied or whether or not power dissipation falls within the predetermined limit in the designed layout. If it has been determined that the timing constraint between circuits is not satisfied or that the power dissipation does not fall within the predetermined limit in the verification, the layout is redesigned to change the arrangement of the circuits.

As a LSI layout method for realizing a low power dissipation while satisfying the timing constraint of the LSI, techniques such as described in Patent Publication JP-11-67925-A are known. In the technique of patent publication, a simulation is performed after completion of the layout design based on an instructed test pattern to thereby obtain signal interconnects effective for reducing the power dissipation. Layout modification is made to the thus obtained signal interconnects to reduce the interconnect length, thereby further reducing the power dissipation. After completion of the layout change, timing analysis is performed to make layout modification once again for a part in which timing error has been detected. Such layout design is performed in the technique of the patent publication to realize an LSI layout achieving a low power dissipation while satisfying a required operating frequency.

As described above, in the technique of the above patent publication, designed layout is changed so as to satisfy a low power dissipation property and, thereafter, another layout change is performed in order to correct the timing error resulting from the layout change. Thus, the layout change is performed twice, involving a longer processing time. Further, in some LSI layouts, there is a case where an interconnect effective for reducing the power dissipation and another interconnect which is likely to undergo the timing error are connected to the same cell or circuit. In such a case, when the error correction is performed using only the timing as criterion, even though there is a solution satisfying both the timing and the reduction in the power dissipation, the length of the interconnect effective for reducing the power dissipation is likely to increase, with the result that a sufficient effect of reduction in the power dissipation cannot be obtained.

SUMMARY OF THE INVENTION

It is an object of the present invention to provide a layout design apparatus, a method thereof, and a program thereof which are capable of achieving a layout that can reduce the power dissipation while satisfying the timing constraint in a single layout modification process.

The present invention provides a layout design apparatus for designing layout of a semiconductor device, including: an input section for receiving circuit-connection data including cells in the semiconductor device and nets connecting the cells, and arrangement/interconnect data including arrangement of the cells and interconnect length of the nets; a power-dissipation calculation section for calculating power dissipation of the semiconductor device based on the circuit-connection data, the arrangement/interconnect data, and power dissipation library data including power dissipation of cells and nets for use in the semiconductor device; an improvement-target-cell extraction section for extracting an improvement-target cell based on the circuit-connection data; a power-dissipation-reduction-possibility judgment section for judging whether or not a reduction in the power dissipation is possible by relocation of the improvement-target cell in a specific shift distance, while assuming the relocation and an associated change in the interconnect length in the arrangement/interconnect data and comparing power dissipations before and after the assumed relocation, which are calculated by the power-dissipation calculation section, a path extracting section for extracting a signal path including the improvement-target cell based on the circuit-connection data after the power-dissipation-reduction-possibility judgment section judges that the reduction in power dissipation is possible; a possible-cell-shift-distance calculation section for calculating a possible shift distance of the improvement-target cell in the extracted signal path based on a delay library data of cells and nets for use in the semiconductor device, the possible shift distance satisfying a delay constraint specified for the semiconductor device; and a layout change section for relocating the improvement-target cell in the arrangement/interconnect data within a range of shift distance in which the specific shift distance and the possible shift distance overlap each other, to update the arrangement/interconnect data.

The present invention also provides a method for design layout of a semiconductor device in a computer system, including the steps of: receiving circuit-connection data including cells in the semiconductor device and nets connecting the cells, and arrangement/interconnect data including arrangement of the cells and interconnect length of the nets; calculating power dissipation of the semiconductor device based on the circuit-connection data, the arrangement/interconnect data, and power dissipation library data including power dissipation of cells and nets for use in the semiconductor device; extracting an improvement-target cell based on the circuit-connection data; judging whether or not a reduction in the power dissipation is possible by relocation of the improvement-target cell in a specific shift distance, while assuming the relocation and an associated change in the interconnect length in the arrangement/interconnect data and comparing power dissipations before and after the assumed relocation, which are calculated in the power dissipation calculating step, extracting a signal path including the improvement-target cell based on the circuit-connection data after the judging step judges that the reduction in power dissipation is possible; calculating a possible shift distance of the improvement-target cell in the extracted signal path based on a delay library data of cells and nets for use in the semiconductor device, the possible shift distance satisfying a delay constraint specified for the semiconductor device; and relocating the improvement-target cell in the arrangement/interconnect data within a range of shift distance in which the specific shift distance and the possible shift distance overlap each other, to update the arrangement/interconnect data.

The present invention also provides a computer program running on a computer to operate the computer in the steps of: receiving circuit-connection data including cells in the semiconductor device and nets connecting the cells, and arrangement/interconnect data including arrangement of the cells and interconnect length of the nets; calculating power dissipation of the semiconductor device based on the circuit-connection data, the arrangement/interconnect data, and power dissipation library data including power dissipation of cells and nets for use in the semiconductor device; extracting an improvement-target cell based on the circuit-connection data; judging whether or not a reduction in power dissipation is possible by relocation of the improvement-target cell in a specific shift distance, while assuming the relocation and an associated change in the interconnect length in the arrangement/interconnect data and comparing power dissipations before and after the assumed relocation, which are calculated in the power dissipation calculating step, extracting a signal path including the improvement-target cell based on the circuit-connection data after the judging step judges that the reduction in power dissipation is possible; calculating a possible shift distance of the improvement-target cell in the extracted signal path based on a delay library data of cells and nets for use in the semiconductor device, the possible shift distance satisfying a delay constraint specified for the semiconductor device; and relocating the improvement-target cell in the arrangement/interconnect data within a range of shift distance in which the specific shift distance and the possible shift distance overlap each other, to update the arrangement/interconnect data.

BRIEF DESCRIPTION OF THE DRAWINGS

FIG. 3 is a schematic diagram showing a concrete example of circuit-connection data;

FIGS. 4A and 4B are a schematic diagram and a table, respectively, for showing the arrangement/interconnect information corresponding to the circuit configuration of FIG. 3;

FIG. 5A is a waveform diagram showing a concrete example of a simulation pattern, and FIG. 5B is a table showing a concrete example of a signal activity rate;

FIGS. 6A, 6B and 6C show a concrete example of delay/power-dissipation library data, wherein FIG. 6A is a table showing a correspondence between respective cells and cell delay time, terminal resistance, and cell power dissipation, FIG. 6B is a table showing interconnect resistance and interconnect capacitance per unit length of the interconnect, and FIG. 6C is a table showing coefficients for use in calculation of the interconnect delay time;

FIG. 7A is a table showing interconnect power dissipation of each net for each time interval thereof and FIG. 7B is a table showing cell power dissipation, interconnect power dissipation, and total power dissipation for each time interval;

FIGS. 8A and 8B show a concrete example of relocation of an improvement-target cell, wherein FIG. 8A is a circuit connection diagram showing the state before relocation, and FIG. 8B is a circuit connection diagram showing the state after relocation;

FIGS. 9A and 9B show a concrete example of relocation of an improvement-target cell with simultaneous use of repeater insertion, wherein FIG. 9A is a circuit connection diagram showing the state before relocation, and FIG. 9B is a circuit connection diagram showing the state after relocation;

FIG. 12 is a schematic diagram showing circuit-connection data after the layout change;

FIGS. 13A and 13B are a schematic diagram and a table for showing arrangement/interconnect information after the layout change;

DETAILED DESCRIPTION OF THE PREFERRED EMBODIMENTS

Figure 1:
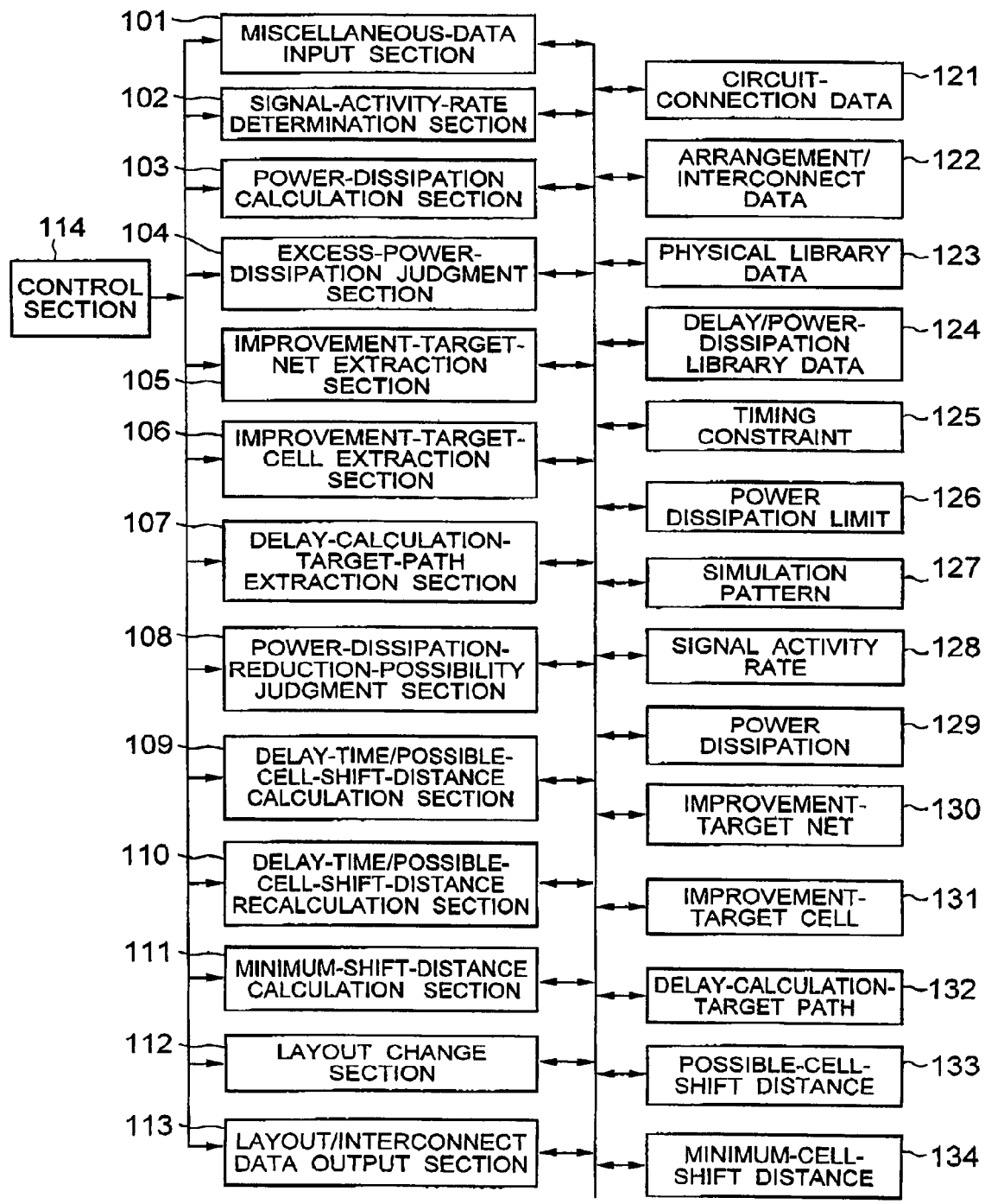
FIG. 1 is a functional block diagram showing the configuration of a layout design apparatus according to an embodiment of the present invention.

An embodiment of the present invention will be described in detail below with reference to the accompanying drawings. FIG. 1 shows the configuration of a layout design apparatus according to an embodiment of the present invention. The layout design apparatus 100 shown in FIG. 1 includes a miscellaneous-data input section 101, a signal-activity-rate determination section 102, a power-dissipation calculation section 103, an excess-power-dissipation judgment section 104, an improvement-target-net extraction section 105, an improvement-target-cell extraction section 106, a delay-calculation-target-path extraction section 107, a power-dissipation-reduction-possibility judgment section 108, a delay-time/possible-cell-shift-distance calculation section 109, a delay-time/possible-cell-shift-distance recalculation section 110, a minimum-shift-distance calculation section 111, a layout change section 112, an layout/interconnect data output section 113, and a control section 114. The layout design apparatus 100 is configured by a computer system and operates in accordance with a predetermined program.

The miscellaneous-data input section 101 inputs information required for performing the LSI layout, such as circuit-connection data 121, layout/interconnect data 122 and physical library data 123, and constraint information such as LSI timing constraint 125 and power dissipation limit 126 and stores them in a storage unit. The miscellaneous-data input section 101 further inputs a simulation pattern 127 and delay/power-dissipation library data 124 which are required for delay-time/power-dissipation calculation and stores them in the storage unit.

The signal-activity-rate determination section 102 refers to the simulation pattern 127 and circuit-connection data 121 to calculate a signal activity rate 128 in the circuit and stores the same in the storage unit. The power-dissipation calculation section 103 refers to the circuit-connection data 121, layout/interconnect data 122, delay/power-dissipation library data 124, and signal activity rate 128 in the LSI circuit, which are calculated by the signal-activity-rate determination section 102 to calculate a power dissipation 129 of the LSI and stores the same in the storage unit. The excess-power-dissipation judgment section 104 compares the power dissipation limit 126 input through the miscellaneous-data input section 101 and the power dissipation 129 calculated by the power-dissipation calculation section 103, to determine whether or not a reduction in the power dissipation is required.

The improvement-target-net extraction section 105 refers to the power dissipation 129 to extract an improvement-target net 130 and stores the same in the storage unit. The improvement-target-cell extraction section 106 refers to the circuit-connection data 121 to extract an improvement-target cell 131 connected to the improvement-target net 130 and stores the same in the storage unit. The delay-calculation-target-path extraction section 107 refers to the circuit-connection data 121 to extract a delay-calculation-target path 132 including the improvement-target cell 131 and stores the same in the storage unit. The power-dissipation-reduction-possibility judgment section 108 determines whether or not a reduction in the power dissipation is possible if the improvement-target cell 131 is assumed to be relocated.

The delay-time/possible-cell-shift-distance calculation section 109 calculates the delay time of the delay-calculation-target path 132 while assuming the relocation of the improvement-target cell 131, calculates backward a possible-cell-shift distance 133 of the improvement-target cell 131 based on the result of calculation of the delay time and stores the calculated possible-cell-shift distance 133 in the storage unit. The cell-shift distance means the distance by which the cell can be shifted. The delay-time/possible-cell-shift-distance recalculation section 110 calculates the delay time of the delay-calculation-target path 132, if the possible-cell-shift distance 133 cannot be calculated by the delay-time/possible-cell-shift-distance calculation section 109. In this calculation, the delay-time/possible-cell-shift-distance recalculation section 110 assumes a repeater insertion to the net having an interconnect length, which may be larger after the relocation of the improvement-target cell 131, and calculates backward the possible-cell-shift distance 133 of the improvement-target cell 131 based on the result of the delay time calculation.

The minimum-shift-distance calculation section 111 calculates, if a solution of the possible-cell-shift distance 133 has been calculated by the delay-time/possible-cell-shift-distance recalculation section 110, a minimum-cell-shift distance 134 of the improvement-target cell 131 which enables a reduction in the power dissipation. The layout change section 112 refers to the possible-cell-shift distance 133 calculated by the delay-time/possible-cell-shift-distance calculation section 109 and minimum-cell-shift distance 134 calculated by the minimum-shift-distance calculation section 111, to perform relocation of the improvement-target cell 131, insertion of a repeater, and redesign for the net connected to the cell and repeater, thereby updating the circuit-connection data 121 and layout/interconnect data 122. The layout/interconnect data output section 113 outputs the layout/interconnect data 122 of the LSI updated by the layout change section 112. The control section 114 controls operation of the above-described sections.

Figure 2:
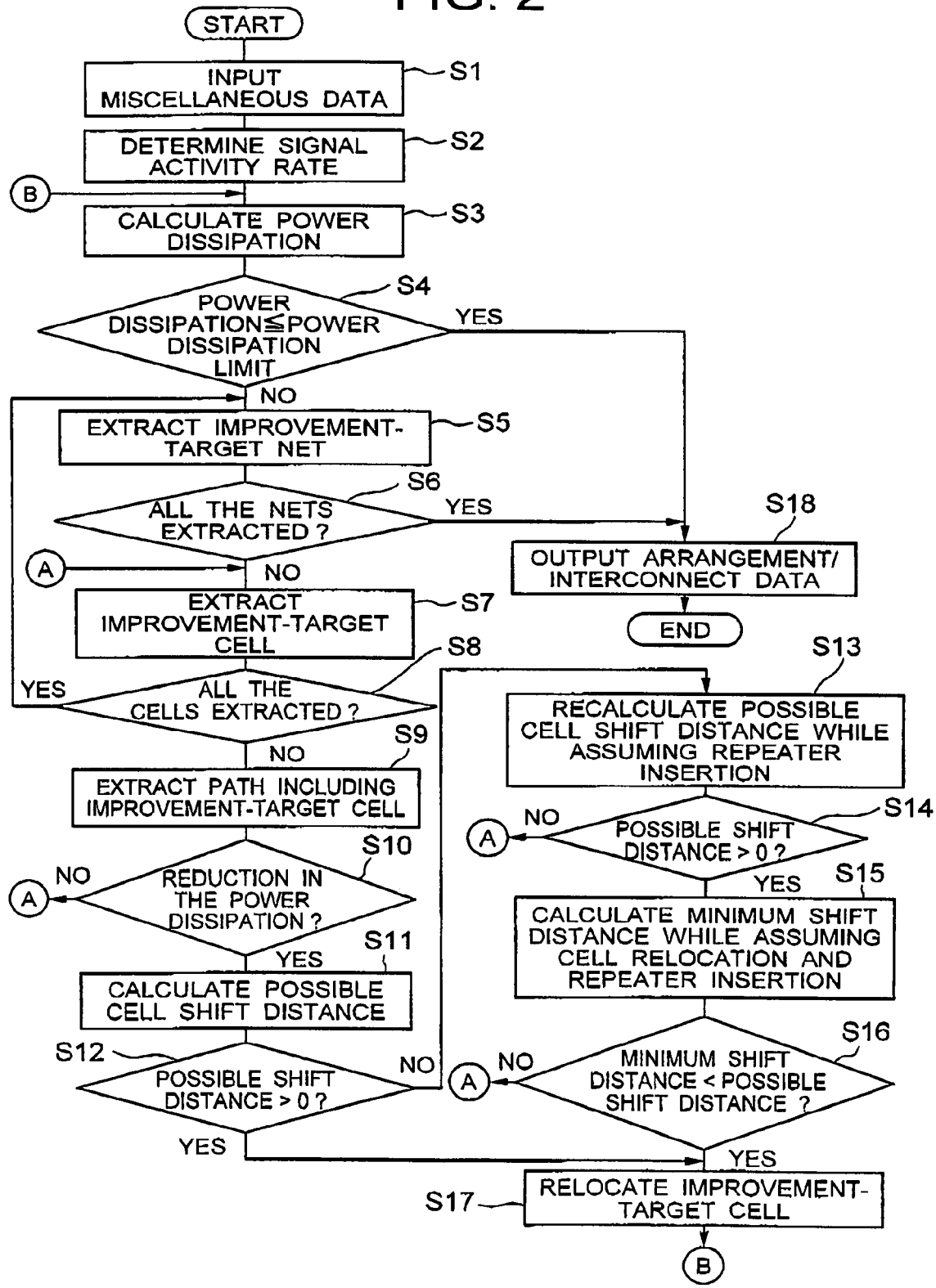
FIG. 2 is a flowchart showing the procedure of the layout design apparatus of FIG. 1.

FIG. 2 shows the procedure of the layout design apparatus 100 shown in FIG. 1. The miscellaneous-data input section 101 inputs: data required for performing the LSI layout, such as circuit-connection data 121, arrangement/interconnect (layout/interconnect) data 122 and physical library data 123; constraint information such as LSI timing constraint 125 and power dissipation limit 126; and simulation pattern 127 and delay/power-dissipation library data 124 which are required for delay-time/power-dissipation calculation (step S1).

FIG. 3 shows a concrete example of the circuit-connection data 121 input in step S1. FIG. 3 depicts only a part of the circuit-connection data 121 for the sake of simplification. The circuit-connection data 121 includes cells for use in the LSI circuit and connection information between the cells. More specifically, in FIG. 3, three types of cells: a flip-flop, a NAND gate, and an OR gate are included therein, and the flip-flop cells C1, C4, the OR gate cell C2, and the NAND gate cell C3 are connected through nets N1 to N3. FIGS. 4A and 4B show the layout/interconnect data 122 corresponding to the circuit of FIG. 3. In these figures, the clock terminals of the flip-flop cells C1 and C4 are omitted for the sake of simplification. The layout/interconnect data 122 includes an arrangement/interconnect diagram on the LSI as shown in FIG. 4A, and the interconnect length of respective nets as shown in FIG. 4B.

The timing constraint 125 input in step S1 is determined depending on the clock frequency at which the LSI to be designed should operate and has a fixed value determined in advance. The power dissipation limit 126 is determined based on factors such as a cooling structure of the LSI and/or battery life and has a fixed value. For example, in step S1, "300" is input as a value of the timing constraint 125, and "8" is input as a value of the power dissipation limit 126. In the following description, it is assumed that the target circuit satisfies the timing constraint 125.

Figures 5A, 5B, 6A, 6B, 6C:
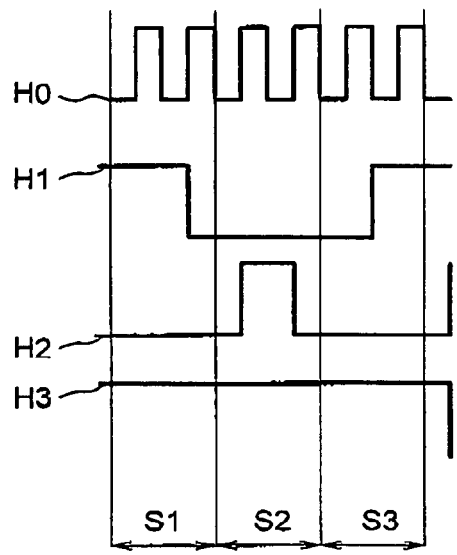

Referring back to FIG. 2, the signal-activity-rate determination section 102 refers to the simulation pattern 127 representing the waveform diagram of signals passing through respective nets in the LSI and the circuit-connection data 121 to calculate a signal activity rate 128 in the circuit (step S2). FIG. 5A shows a concrete example the simulation pattern 127, and FIG. 5B shows a concrete example of the signal activity rate 128. Waveforms H1 to H3 in the simulation pattern 127 shown in FIG. 5A represent the signal waveforms of the nets N1 to N3 shown in FIG. 3. A waveform H0 represents a clock signal which alternately assumes a high level and a low level on a periodic basis.

The code represented by the waveforms H1 to H3 is set at a high level, "1", or a low level, "0", at the instant when the waveform H0 changes from a low level to a high level. Further, the code of the waveforms H1 to H3 is determined based on functions of the cells connected on the proximal and distal ends of the net, code of waveforms input to the cells, and connection relationship between cells.

The signal activity rate is defined by a quotient obtained by dividing the number of times of signal changes in a given clock period by the number of times the clock signal (H0) changes from a low level to a high level. For example, signal activity rate A1 of the net N1 (waveform H1) in time interval S1 in FIG. 5A is calculated as follows: ½ (single change of waveform H1/two changes of clock waveform H0 from low level to high level)=0.5. Calculated results of the signal activity rates 128 of the respective nets are shown in FIG. 5B.

After the calculation of the signal activity rate 128, the power-dissipation calculation section 103 refers to the circuit-connection data 121, layout/interconnect data 122, delay/power-dissipation library data 124, and signal activity rate 128 calculated by the signal-activity-rate determination section 102 to calculate the power dissipation 129 of the LSI (step S3). The power dissipation is roughly divided into power dissipation (cell power dissipation) PC caused by devices such as the cell or flip-flop in the circuit and power dissipation (interconnect power dissipation) PN caused by the interconnect between the devices. Each cell used in the circuit has a specific cell power dissipation, which is given through the miscellaneous-data input section 101 as the delay/power-dissipation library data 124.

FIGS. 6A to 6C show a concrete example of the delay/power-dissipation library data 124, wherein FIG. 6A shows a correspondence between respective cells and cell delay time, terminal resistance, and cell power dissipation, FIG. 6B shows interconnect resistance and interconnect capacitance per unit length of the interconnect, and FIG. 6C shows coefficients for use in calculation of the interconnect delay time. Such information is entered in advance by using the miscellaneous-data input section 101.

The following formula (1) is used to obtain the interconnect power dissipation PN:

$$PN = C \times Vdd^2 \times Kd \times fck \quad (1),$$

which is described as formula (4-68) in page 261 of "Digital Systems Engineering" (issued by Maruzen Co., Ltd.). In this formula, "C" is load capacitance of the output terminal of the cell, Vdd is power supply voltage, and fck is clock frequency. Kd is duty factor (maximum change rate of signal relative to clock period) and, if the signal activity factor=1, then a value 0.5 is obtained as Kd. Since $Vdd^2$ and fck are fixed values in the formula (1), the formula (1) can be simplified as follows assuming that $Vdd^2 \times fck = 1$:

$$PN = (\tfrac{1}{2}) \times C \times A \quad (2)$$

A" in the formula (2) is the signal activity rate in a given simulation time interval.

Load capacitance C in the formula (2) is represented by the interconnect capacitance of the net connected to the output terminal, and the input terminal capacitance of the cell. With respect to the interconnect capacitance, an approximate calculation using the capacitance per unit interconnect length is generally performed for simplification of calculation. The interconnect capacitance has a value proportional to the interconnect length. The interconnect capacitance C1 per unit interconnect length can be acquired by referring to the delay/power-dissipation library data 124 (FIG. 6B), whereas the interconnect length can be acquired by referring to the layout/interconnect data 122 (FIG. 4B). Description of the input terminal capacitance of the cell is omitted herein for the sake of simplification.

Thus, interconnect power dissipation PN1 of the net N1 in time interval S1 can be calculated using the following formula (3):

$$PN1 = (\tfrac{1}{2}) \times C1 \times L1 \times A1 \quad (3).$$

L1 in the formula (3) is the interconnect length of the net N1. It is to be noted that the interconnect length of N1 is set to 10, as shown in the layout/interconnect data 122 (FIG. 4B). The signal activity rate A1 of the net N1 in the time interval S1 is set to 0.5, as shown by the signal activity rate 128 in FIG. 5B, which is calculated by the signal-activity-rate determination section 102. As a result, the interconnect power dissipation PN1 of the net N1 in the time interval S1 assumes 2.5(=(½)× 1×10×0.5). A similar calculation procedure is applied for the other time intervals and other nets.

FIG. 7A shows the interconnect power dissipation of each net for each time interval, and FIG. 7B shows cell power dissipation, interconnect power dissipation, and total power dissipation for each time interval. By calculating the interconnect consumption power for each net, the table shown in FIG. 7A is obtained. The cell power dissipation is the total sum of cell power dissipations of the respective cells configuring the LSI for each time interval. The interconnect power dissipation is the total sum of interconnect power dissipations of the respective nets for each time interval and can be obtained by adding up values listed in the table of FIG. 7A for each time interval. The total consumption power, which is the sum of the cell power dissipation and interconnect power dissipation, represents the power dissipation in the entire LSI for each time interval.

The power-dissipation calculation section 103 stores values listed in the tables of FIG. 7A (values of interconnect power dissipation calculated for all the time intervals and for all patterns) and FIG. 7B (values of the cell power dissipation for all the time intervals, values of the interconnect power dissipation for all the time intervals, and values of the total power dissipation which is the sum of the cell power dissipation and interconnect power dissipation calculated for all the time intervals) as a power dissipation 129. Although a method for reducing the power dissipation includes two methods: one is an average-power-dissipation-reduction method that reduces the power dissipation of the net whose average activity rate in all simulation sections is high; and the other is a peak-power-dissipation-reduction method that reduces locally high power dissipation among power dissipations of each simulated time interval. The latter, i.e., peak-power-dissipation-reduction method is adopted in the present embodiment.

After calculation of the power dissipation, the excess-power-dissipation judgment section 104 compares power dissipation 129 calculated by the power-dissipation calculation section 103 against tile power dissipation limit 126, to thereby determine whether or not violation of the a power dissipation limit has occurred, i.e., a reduction in the power dissipation is required or not (step S4). More specifically, if the maximum value of the total power dissipation of the power dissipation 129 is larger than the power dissipation limit 126, the excess-power-dissipation judgment section 104 determines that a reduction in the power dissipation is required; whereas if the power dissipation 129 is not larger than the power dissipation limit 126, the excess-power-dissipation judgment section 104 determines that a reduction in the power dissipation is not required. If it has been determined that a reduction in the power dissipation is not required, the layout/interconnect data output section 113 outputs the layout/interconnect data 122 (step S18) and the process is ended. In FIG. 7B, the total power dissipation in time interval S2 is "9", which is larger than the value "8" of the power dissipation limit 126 input in step S1. In this case, therefore, it is determined that a reduction in the power dissipation is required.

When it has been determined in step S4 that a reduction in the power dissipation is required, the improvement-target-net extraction section 105 refers to the power dissipation 129 calculated in step S3 to extract an improvement-target net 130 (step S5). More specifically, the improvement-target-net extraction section 105 refers to the power dissipation 129 (FIG. 7) to select a time interval having the highest total power dissipation from all the simulated time intervals, and then sequentially selects the nets in the selected time interval in the descending order of the interconnect power dissipation as the improvement-target net 130.

In FIG. 7B, time interval S2 is a time interval having the, highest power dissipation. Further, as shown in FIG. 7A, a net having the highest interconnect power dissipation in time interval S2 is PN2, and accordingly PN2 is selected as the improvement-target net 130. The improvement-target-net extraction section 105 then determines whether or not it has examined all the nets (step S6). If it has been determined so, since a further layout change is impossible, the processing by the improvement-target-net extraction section 105 advances to step S18 where it outputs the layout/interconnect data 122.

The improvement-target-cell extraction section 106 refers to the circuit-connection data 121 to extract an improvement-target cell 131 connected to the improvement-target net 130 (step S7). More specifically, the improvement-target-cell extraction section 106 refers to the circuit-connection data 121 (FIG. 3) to select one of the cells connected to the improvement-target net 130 as the improvement-target cell 131. In FIG. 3, cells C2 and C3 are connected to the improvement-target net N2. In this case, in step S7, cell C2 or C3 is extracted as the improvement-target cell 131 (in this embodiment, C3 is assumed to be extracted). The improvement-target-cell extraction section 106 then determines whether or not it has processed all the cells connected to the current improvement-target net 130 (step S8). If it has been determined so, the processing by the improvement-target-cell extraction section 106 returns to step S5 in order to select the next improvement-target net 130.

After extraction of the improvement-target cell 131, the delay-calculation-target-path extraction section 107 refers to the circuit-connection data 121 to extract a delay-calculation-target path 132 including the improvement-target cell 131 (step S9). The delay-calculation-target path 132 is a path connecting between the input terminal of the LSI and the flip-flop or between flip-flops and can be obtained by referring to the circuit-connection data 121 to trace a connection relationship between the cell and the net. In the example of FIG. 3, a specific target path extending from the input terminal of the flip-flop C1, passing through the net N1, cell C3, and net N3 to the input terminal of the flip-flop C4 (i.e., path from cell C1 to C4) exists and this path is extracted as the delay-calculation-target path 132. If a plurality of the target paths exist, all the target paths are extracted.

Figure 8A:
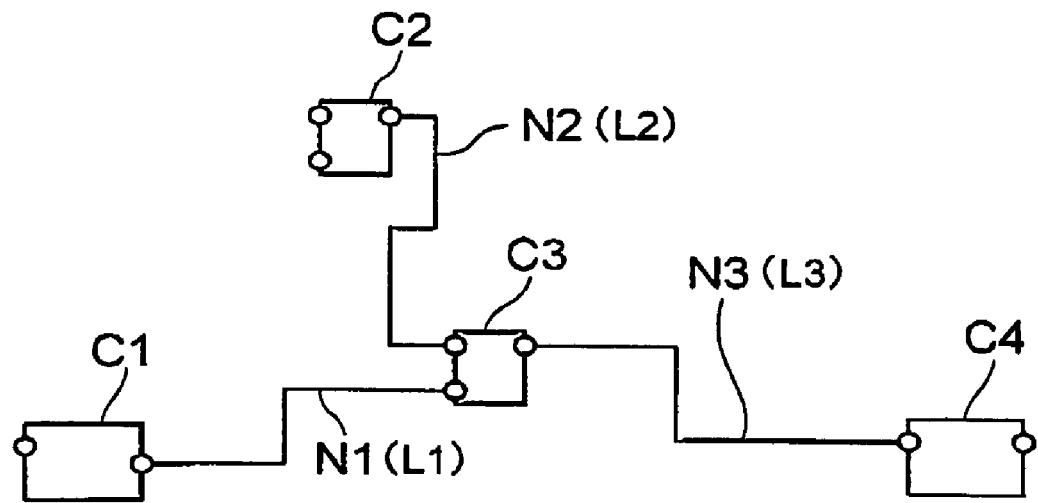
Figure 8B:
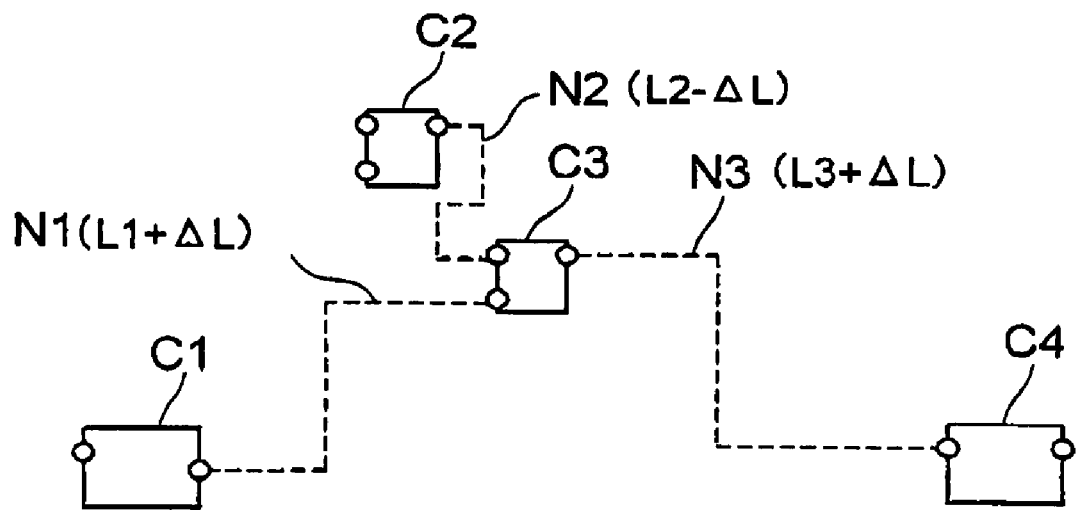

The power-dissipation-reduction-possibility judgment section 108 determines whether a reduction in the power dissipation is possible or not if the improvement-target cell 131 is assumed to be relocated (step S10). FIG. 8 shows a concrete example of relocation of the improvement-target cell 131, FIG. 8A shows a state where the improvement-target cell 131 has not been relocated, and FIG. 8B shows a state where it has been relocated. In FIG. 8B, the improvement-target cell C3 is relocated from the position shown in FIG. 8A such that the improvement-target net N2 is made shorter by a length $\Delta L$ ($\Delta L > 0$). In this case, assume that the lengths of the nets N1 and N3 become larger than those before relocation by a length $\Delta L$ (which is the same as the distance by which the improvement-target net N2 is shortened), respectively. In this case, the interconnect power dissipation of the elongated net N1 is obtained from the formula (3) as follows:

$$PN1 = (\tfrac{1}{2}) \times C1 \times (L1 + \Delta L) \times A1$$

That is, the interconnect power dissipation of the elongated net N1 becomes larger than that before relocation by $(\tfrac{1}{2}) \times C1 (\Delta L) \times A1$, interconnect power dissipation of the shortened net N2 becomes smaller than that before relocation by $(\tfrac{1}{2}) \times C1 (\Delta L) \times A2$, and interconnect power dissipation of the elongated net N3 becomes larger than that before relocation by $(\tfrac{1}{2}) C1(\Delta L) \times A3$.

Assume that the decrease in the power dissipation due to relocation of the improvement-target cell 131 is $\Delta P1$. In this case, when $\Delta L > 0$ is satisfied, that is, when $\Delta P1 = (\tfrac{1}{2}) \times C1 \times \Delta L \times \{A2 - (A1+A3)\} > 0$ is satisfied if the interconnect length L2 of the net N2 is made smaller, the power dissipation can be reduced than that before relocation. The interconnect capacitance of C1 per unit interconnect length is "1" as shown in FIG. 6B, and activity rates A1, A2, and A3 of the respective nets in time interval S2 are "0", "1", and "0", respectively as shown in FIG. 5B. In this case, $$\Delta P1 = (\tfrac{1}{2}) \times \Delta L$$

is satisfied. Since $\Delta L > 0$, $\Delta P1 > 0$ is satisfied, with the result that a reduction in the power dissipation is determined to be possible in step S10. When it has been determined in step S10 that a reduction in the power dissipation is impossible, the processing flow returns to step S7 where the power-dissipation-reduction-possibility judgment section 108 selects another cell connected to the improvement-target net 130 as the improvement-target cell 131.

When it has been determined that a reduction in the power dissipation is possible, the delay-time/possible-cell-shift-distance calculation section 109 calculates the delay time of the delay-calculation-target path 132 assuming the relocation of the improvement-target cell 131 and calculates back a cell-shift distance of the improvement-target cell 131 based on a result of the calculation of the delay time (step S11). Thereafter, based on the obtained movable distance, the delay-time/possible-cell-shift-distance calculation section 109 determines whether relocation of the improvement-target cell 131 is possible (step S12). When it has been determined that relocation is possible, the process advances to step S17 for layout change.

A description will be made of the calculation of the path delay time before description of a detailed procedure of step S11. The path delay time is time required for a signal to pass through a path, that is, to pass between the input/output terminal of the LSI and flip-flop or between flip-flops. In FIG. 3, the time required for a signal to pass through a path extending from the input terminal of the flip-flop C1, passing through the net N1, cell C3, and net N3 to the input terminal of the flip-flop C4 is calculated.

The path delay time is roughly configured by cell delay time occurring when a signal passes from the input terminal of a cell to output terminal thereof and interconnect delay time occurring when a signal passes through an interconnect. Assuming that the cell delay time of the cells C1 and C3 are TC1, and TC3 and interconnect delay time of the nets N1 to N3 are TN1 to TN3, delay time T of the path from the cells C1 to C4 of FIG. 3 can be represented by the following formula:

$$T = TN1 + TN3 + TC1 + TC3 \tag{4}$$

A fixed value is previously set for the delay time of each cell in accordance with each cell type and is stored in the delay/power-dissipation library data 124 (FIG. 6A). Although a combination of the input and output terminals allows a plurality of delay values to exist in a precise sense, a single delay value is used here for the sake of simplification.

Although various calculation methods are proposed for the interconnect delay time, Elmore's interconnect delay model is used here (refer to Technical Report of Institute of Electronics, Information and Communication Engineers, VLD2000-48 to 56 [VLSI Design Technologies] VLD2000-51 "Clock tree synthesis for shrinking a chip design" written by Hiroaki Inoue and Masato Edahiro). In the Elmore's delay model, the delay time of an interconnect path measured from output point to input point is represented by the total sum of products of resistances existing between the two points and downstream capacitance including between the two points. Based on the above formula, the interconnect delay is calculated from the terminal resistance, interconnect resistance, and interconnect capacitance. Although the load capacitance includes the input terminal capacitance of a cell in addition to the interconnect capacitance, the cell input terminal capacitance is ignored here for the sake of simplification.

Wiring delay time TN1 of the net N1 can be represented by the following formula (5):

$$TN1 = K1 \times RO1 \times (CN1) + K2 \times RN1 \times (CN1) \tag{5}$$

RO1 in the formula (5) is output terminal resistance of the cell C1. A fixed value is previously set for the output terminal resistance RO1 in accordance with each cell type and is stored in the delay/power-dissipation library data 124 (FIG. 6A). With respect to interconnect resistance RN1 and interconnect capacitance CN1, approximate calculation using a value per unit interconnect length is generally performed for simplification of calculation. Each of the interconnect resistance and interconnect capacitance has a value proportional to the interconnect length. The interconnect resistance and interconnect capacitance per unit interconnect length are stored in the delay/power-dissipation library data 124 (FIG. 6B) as R1 and C1, respectively. K1 and K2 in the formula (5) are fixed numbers and are stored in the delay/power-dissipation library data 124 (FIG. 6C).

The above formula (5) for calculating interconnect delay time TN1 of the net N1 can be modified using values stored in the delay/power-dissipation library data 124 to formula (6) as follows:

$$TN1 = K1 \times RO1 \times (C1 \times L1) + K2 \times (R1 \times L1) \times (C1 \times L1) \qquad (6)$$

L1 is the interconnect length of the net N1 and is set to "10", as shown in the layout/interconnect data 122 (FIG. 4B). Further, as shown in the delay/power-dissipation library data 124 (FIG. 6), coefficients K1 and K2 are set to "2" and "1" respectively, RO1 is set to "2", interconnect capacitance C1 per unit interconnect length is set to "1", and interconnect resistance R1 per unit interconnect length is set to "1". Thus, interconnect delay time TN1 of the net N1 is calculated as follows:

$$TN1 = 2 \times 2 \times (1 \times 10) + 1 \times (1 \times 10) \times (1 \times 10) = 140$$

If the interconnect has no branch, parameters in the calculation formula of the interconnect delay time are not changed from those in the formula (6), and interconnect delay time TN3 of the net N3 configuring the same path can be calculated by the following formula (7):

$$TN3 = K1 \times RO3 \times (C1 \times L3) + K2 \times (R1 \times L3) \times (C1 \times L3). \qquad (7)$$

If TN3 is calculated referring to the layout/interconnect data 122 (FIG. 4B) and delay/power-dissipation library data 124 (FIG. 6), then TN3=140 is obtained.

Cell delay time TC1 and cell delay time TC3 are "10", as shown in the delay/power-dissipation library data 124 (FIG. 6A). By substituting those values as described above into the formula (4), delay time T of the path is calculated as follows:

$$\begin{aligned} T &= TN1 + TN3 + TC1 + TC3 \\ &= 140 + 140 + 10 + 10 \\ &= 300 \end{aligned}$$

Assuming that the value of the timing constraint 125 input in step S1 is 300, this path just satisfies the timing constraint.

Next, a description will be made of calculation of the movable distance, or shift distance, performed in step S11. If the improvement-target net N2 is made shorter by a length of $\Delta L$ and thereby the other nets N1 and M3 are made longer by the length of $\Delta L$ as shown in FIG. 8B, interconnect delay time TN1' and TN3' of the nets N1 and N3 can be represented as follows:

$$TN1' = K1 \times RO1 \times (C1 \times (L1 + \Delta L)) + K2 \times (R1 \times (L1) + \Delta L)) \times \qquad (8)$$
$$(C1 \times (L1 + \Delta L)); \text{ and}$$

$$TN3' = K1 \times RO3 \times (C1 \times (L3 + \Delta L)) + K2 \times (R1 \times (L3) + \Delta L)) \times \qquad (9)$$
$$(C1 \times (L3 + \Delta L)).$$

All parameters other than $\Delta L$ are known values and, by substituting the known values into the above formulas (8) and (9), the following formula (10) can be obtained:

$$TN1' = \Delta L^2 + 24 \times \Delta L + 140$$

$$TN3' = \Delta L^2 + 24 \times \Delta L + 140 \qquad (10)$$

After relocation of the improvement-target cell 131, path delay time T' is represented as follows:

$$T' = TM1' + TN3' + TC1 + TC3 \qquad (11)$$

Since the cell delay time TC1 and cell delay time TC3 are "10" as shown in FIG. 6A, the formula (11) is calculated as follows:

$$\begin{aligned} T' &= \Delta L^2 + 24 \times \Delta L + 140 + \Delta L^2 + 24 \times \Delta L + 140 + 10 + 10 \\ &= 2 \times \Delta L^2 + 48 \times \Delta L + 300 \end{aligned}$$

The T' obtained as described above is the delay time of the path after cell relocation. The T' needs to be not more than 300 which is the timing constraint 125, that is, $$T' = 2 \times \Delta L^2 + 48 \times \Delta L + 300$$

needs to be satisfied.

The above formula can be simplified as follows:

$$\Delta L^2 + 24 \times \Delta L \leq 0 \qquad (12)$$

The above formula (12) is a quadratic inequality with respect to $\Delta L$. If a real number range can be obtained as the range of $\Delta L$ and there is a range in which this range overlaps a precondition ($\Delta L > 0$) for a reduction in the power dissipation, when the quadratic inequality is solved, that is, if a positive real solution is obtained as the solution of $\Delta L$, it is determined in step S12 that relocation of the improvement-target cell 131 is possible and the positive real number (upper limit in the range of $\Delta L$) is stored as the possible-cell-shift distance 133.

If a plurality of paths exist, the shift distance $\Delta L$ of the improvement-target cell 131 that satisfies the timing constraint 125 for all the paths is calculated. If a positive real value is obtained as the solution of $\Delta L$ for all the paths, it is determined that the relocation is possible and the $\Delta L$ that makes the interconnect length of the improvement-target net 130 smallest among $\Delta L$s of all the paths is stored as the possible-cell-shift distance 133. If a positive real value cannot be obtained in any of the paths, it is determined that there is no solution and thereby that the relocation is impossible. A solution of the above formula (12) is:

$$-24 \leq \Delta L \leq 0,$$

in which $\Delta L$ is not a positive real number and, therefore, it is determined that there is no solution. Thus, in step S12, it is determined that the relocation is impossible.

When it has been determined that the relocation is impossible in step S12, the delay-time/possible-cell-shift-distance recalculation section 110 calculates the delay time of the delay-calculation-target path 132 assuming a repeater insertion to the net having an interconnect length that will be larger due to the relocation of the improvement-target cell 131, and calculates backward the possible-cell-shift distance 133 of the improvement-target cell 131 based on the calculated result of the delay time (step S13). The delay-time/possible-cell-shift-distance recalculation section 110 then determines whether or not relocation of the improvement-target cell 131 is possible based on the obtained possible-cell-shift distance 133 (step S14).

Figure 9A:
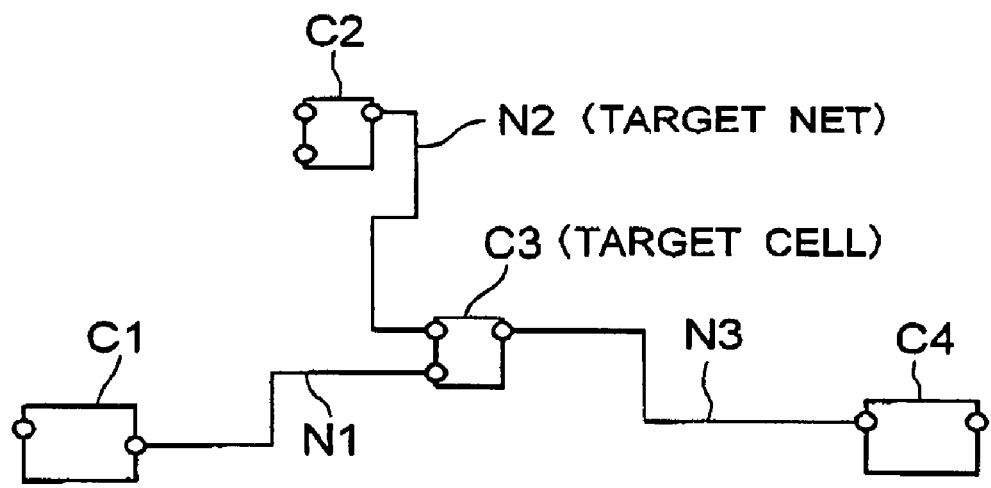
Figure 9B:
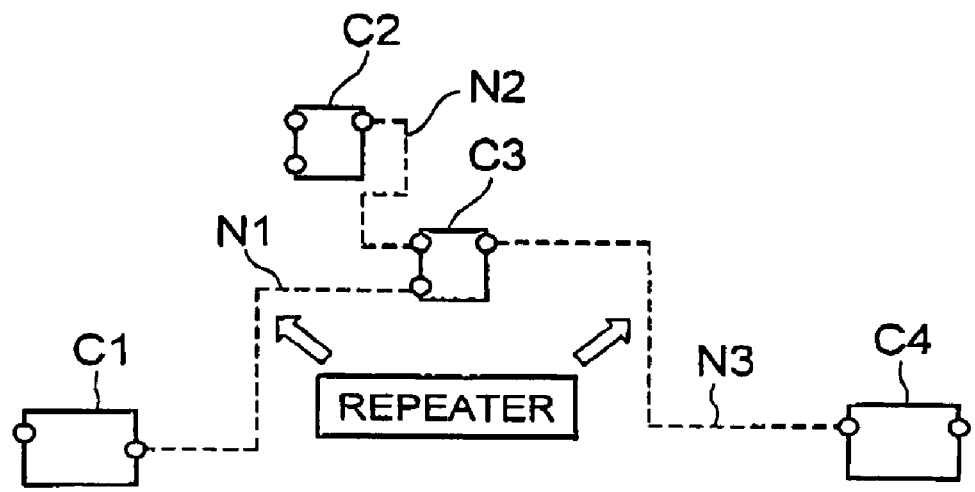

FIGS. 9A and 9B show a concrete example of relocation of the improvement-target cell 131, wherein FIG. 9A shows the state where the improvement-target cell 131 has not been relocated, and FIG. 9B shows the state where it has been relocated. When the interconnect length of the improvement-target net N2 in the state shown in FIG. 9A is made smaller, the interconnect lengths of the other nets N1 and N3 are made larger as shown in FIG. 9B. These elongated nets N1 and N3 are extracted as repeater-insertion target nets. As in the case of step S10, it is assumed, in calculation of the interconnect delay time assuming the insertion of a repeater, that the length of the nets N1 and N3 will be larger than those before the relocation by a length $\Delta L$, which is the same as the distance by which the improvement-target net N2 is shortened. Further, it is assumed that when the net is divided into two parts due to the insertion of a repeater, the interconnect length of each divided net is obtained by multiplying, by 0.5, a value obtained by adding $\Delta L$ to the interconnect length of the original net.

Figure 10:
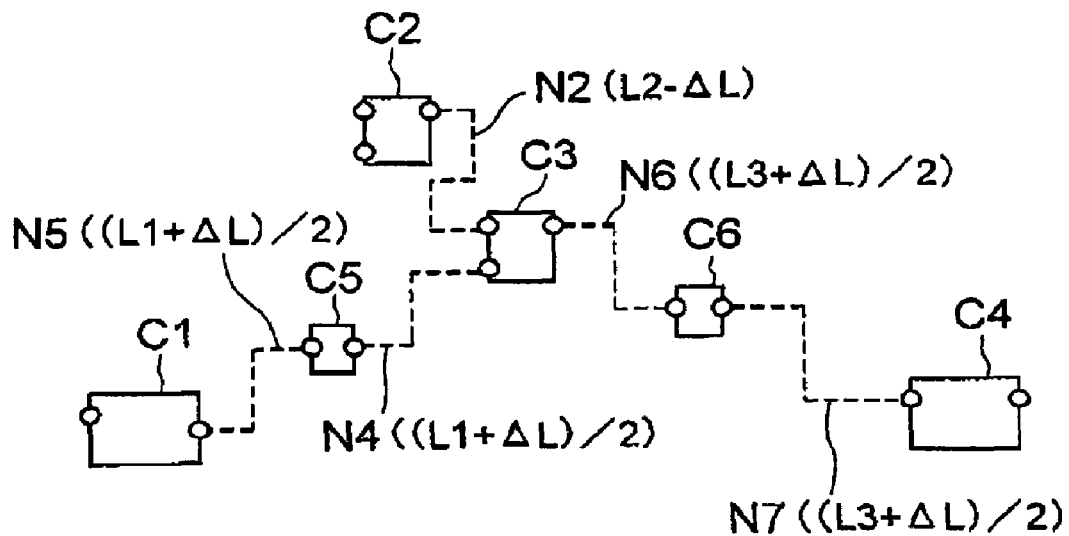
FIG. 10 is a circuit connection diagram showing a concrete example of repeater insertion.

FIG. 10 shows a concrete example of repeater insertion. A repeater cell C5 is inserted into the net N1. The insertion of the repeater cell C5 divides the net N1 into two parts: nets N4 and N5. The interconnect length of the nets N4 and N5 are set at half the sum of interconnect length L1 of net N1 and $\Delta L$. Similarly, insertion of a repeater C6 divides the net N3 into two parts: nets N6 and N7. The interconnect length of the nets N6 and N7 are set at half the sum of the interconnect length L3 of net N3 and $\Delta L$.

Interconnect delay time TN4' to TN7' of the nets N4 to N7 after the repeater insertion (FIG. 10) can be calculated as follows:

$$TN4' = K1 \times RO1 \times C1 \times ((L1 + \Delta L)/2) + K2 \times R1 \times ((L1 + \Delta L)/2) \times C1 \times ((L1 + \Delta L)/2); \quad (13)$$

$$TN5' = K1 \times RO5 \times C1 \times ((L1 + \Delta L)/2) + K2 \times R1 \times ((L1 + \Delta L)/2) \times C1 \times ((L1 + \Delta L)/2); \quad (14)$$

$$TN6' = K1 \times RO3 \times C1 \times ((L3 + \Delta L)/2) + K2 \times R1 \times ((L3 + \Delta L)/2) \times C1 \times ((L3 + \Delta L)/2); \text{ and} \quad (15)$$

$$TN7' = K1 \times RO6 \times C1 \times ((L3 + \Delta L)/2) + K2 \times R1 \times ((L3 + \Delta L)/2) \times C1 \times ((L3 + \Delta L)/2), \quad (16)$$

RO5 and RO6 are output terminal resistances of the repeater cells C5 and C6. Referring to FIG. 6A, the values of the RO5 and RO6 are "1", respectively. All the values other than $\Delta L$ are known. Thus, the above formulas (13) to (16) can be calculated as follows:

$TN4'=20+2\times\Delta L+(100+2\times L1+\Delta L^2)/4;$ $TN5'=10+\Delta L+(100+2\times L1+\Delta L^2)/4;$ $TN6'=20+2\times\Delta L+(100+2\times L1+\Delta L^2)/4;$ and $TN7'10+\Delta L+(100+2\times L1+\Delta L^2)/4.$ Delay time T' of the path from the cells C1 to C4 in the state after the repeater insertion (FIG. 10) can be calculated as follows:

$$T'=TN4+TN5+TN6+TN7+TC1+TC3+TC5+TC6 \quad (17),$$

wherein, TC5 and TC6 are cell delay time of the inserted repeater cells C5 and C6, respectively, and are set at "10" as shown in FIG. 6A. By substituting these values into the above formula (17), the following formula is obtained:

$T'=\Delta L^2+8\times\Delta L+200.$

Since this T' needs to be not more than 300 which is the timing constraint 125, a positive real solution of $\Delta L$ that satisfies the following formula:

$\Delta L^2+8\times\Delta L+200 \leq 300;$ and $$\Delta L^2+8\times\Delta L-100 \leq 0 \quad (18)$$

is the possible-cell-shift distance 133 to be obtained.

When the above formula (18) is solved for the $\Delta L$ and if a positive real value is obtained as the solution of $\Delta L$, it is determined in step S14 that the cell relocation and repeater insertion are possible and the solution of $\Delta L$ is stored as the possible-cell-shift distance 133. If a positive real value cannot be obtained, it is determined that the relocation is impossible. Thereafter, the processing flow returns to step S7, where another cell is selected as the improvement-target cell 131. If a plurality of paths exist, then it is determined, as in the case of step S12, that the cell relocation and repeater insertion are possible when a positive real solution is obtained as the solution of $\Delta L$ for all the paths, whereas it is determined that the cell relocation and repeater insertion are impossible if a positive real solution cannot be obtained in any of the paths. When the above formula (18) is solved, the following relationship:

$-14.75 \leq \Delta L \leq 6.75$ is obtained, in which a positive real solution can be obtained as a solution of $\Delta L$, and the maximum value of $\Delta L$ in the positive range, that is, $\Delta L=6.75$ that makes the interconnect length of the improvement-target net N2 smallest is stored as the possible-cell-shift distance 133.

The formula (5) representing the interconnect delay time includes a term calculated by a product of interconnect resistance and interconnect capacitance, wherein the interconnect resistance and interconnect capacitance are values proportional to the interconnect length. Therefore, there exists a term that increases in proportion to the square of the interconnect length in the formula (5) representing the interconnect delay time. This implies that even when the interconnect length of the net increases due to cell relocation, it is possible to prevent the interconnect delay time from being increased or it is possible to reduce the interconnect delay time by dividing the interconnect using a repeater to reduce the individual interconnect lengths. Even when the cell delay time is increased due to the repeater insertion, it is possible to prevent the path delay time from being increased, so long as a decrease in the interconnect delay time due to the interconnect division is larger than an increase in the cell delay time due to the repeater insertion.

After the possible-cell-shift distance 133 caused by the cell relocation and repeater insertion has been obtained by the delay-time/possible-cell-shift-distance recalculation section 110, the minimum-shift-distance calculation section 111 calculates a minimum-cell-shift distance 134 of the improvement-target cell 131 which provides a reduction in the power dissipation (step S15). More specifically, the minimum-shift-distance calculation section 111 calculates the power dissipation in the circuit configuration (FIG. 10) after the repeater insertion, and then calculates ΔL that makes the calculated power dissipation smaller than the power dissipation obtained in step S3 to obtain the minimum-cell-shift distance 134. As a time interval to be subjected to the power dissipation calculation when the minimum-cell-shift distance 134 is calculated, the time interval S2, which has been used for selecting the improvement-target net 130 in step S5, having the highest total power dissipation in the table of FIG. 7B is adopted. After calculation of the minimum-cell-shift distance 134, the minimum-cell-shift distance 134 and possible-cell-shift distance 133 calculated in step S13 are compared against each other, to determine whether or not a reduction in the power dissipation is possible by the cell relocation and repeater insertion (step S16).

Although the repeaters C5 and C6 have been inserted into the nets N1 and N3 in FIG. 10, the signal activity rate of the respective nets does not change before and after the interconnect division. Therefore, as the signal activity rate of the nets N4 and N5, the activity rate (A1 of FIG. 5B) of the net N1 before the interconnect division can be used. Similarly, as the activity rate of the nets N6 and N7, the activity rate (A3) of the net N3 before the interconnect division can be used. Assuming that the power dissipations of the cells C1 to C6 are PC1' to PC6', respectively, and that the is interconnect power dissipations of the nets N2 and N4 to N7 are PN2' and PN4' to PN7', respectively, power dissipation P' in the entire circuit shown in FIG. 10 can be represented by the following formula:

$$P' = PC1' + PC2' + PC3' + PC4' + PC5' + PC6' + PN2' + PN4' + PN5' + PN6' + PN7'$$

The interconnect power dissipations PN2' to PN7' of the nets N2, N4, N5, N6, and N7 can be calculated as follows:

$$PN2' = (1/2) \times C1 \times (L2 - \Delta L)/2 \times A2$$
$$= (1/2) \times 1 \times (14 - \Delta L) \times 1 = 7 - \Delta L/2;$$

$$PN4' = (1/2) \times C1 \times (L1 + \Delta L)/2 \times A1$$
$$= (1/2) \times 1 \times (10 + \Delta L)/2 \times 0 = 0;$$

$$PN5' = (1/2) \times C1 \times (L1 + \Delta L)/2 \times A1$$
$$= (1/2) \times 1 \times (10 + \Delta L)/2 \times 0 = 0;$$

$$PN6' = (1/2) \times C1 \times (L3 + \Delta L)/2 \times A3$$
$$= (1/2) \times 1 \times (10 + \Delta L)/2 \times 0 = 0; \text{ and}$$

$$PN7' = (1/2) \times C1 \times (L3 + \Delta L)/2 \times A3$$
$$= (1/2) \times 1 \times (10 + \Delta L)/2 \times 0 = 0.$$

Referring to FIG. 6A, the cell power dissipation of the cells C1 to C4 and repeater cells C5 and C6 is 0.5. Thus, the power dissipation P' of the entire circuit shown in FIG. 10 can be calculated as follows:

$$P' = 10 - \Delta L/2.$$

If the P' obtained in this manner is smaller than the total power dissipation "9" (FIG. 7B) of the time interval S2 which has been obtained in step S3, it can be said that the power dissipation has been reduced by the cell relocation and repeater insertion. The condition that satisfies the relationship P'=10−ΔL/2<9 is that ΔL>2. In this case, ΔL=2 is stored as the minimum-cell-shift distance 134.

If it has been determined in step S16 that the minimum-cell-shift distance 134 is not more than the possible-cell-shift distance 133 calculated in step S13 and smaller than the interconnect length. (L2=10) of the net N2, it is determined that a reduction in the power dissipation is possible. Otherwise, it is determined that a reduction in the power dissipation is impossible, and the process returns to step S7, where another improvement-target cell 131 is selected. In the above example, the minimum-cell-shift distance 134 is "2", which is smaller than the value "6.75" of the possible-cell-shift distance 133. Therefore, it is determined that a reduction in the power dissipation is possible.

If it has been determined in step S16 that a reduction in the power dissipation is possible, the layout change section 112 refers to the possible-cell-shift distance 133 and minimum-cell-shift distance 134 to perform layout change i.e., relocation of the improvement-target cell 131 and repeater insertion (step S17). After the layout change, the layout change section 112 performs redesign the interconnect for the net connected to the relocated cell and inserted repeater, and updates the circuit-connection data 121 and layout/interconnect data 122. In step S17, the improvement-target cell 131 is relocated by a distance not more than the possible-cell-shift distance 133 and larger than the minimum-cell-shift distance 134 such that the interconnect length of the improvement-target net 130 will be shorter.

Figure 11:
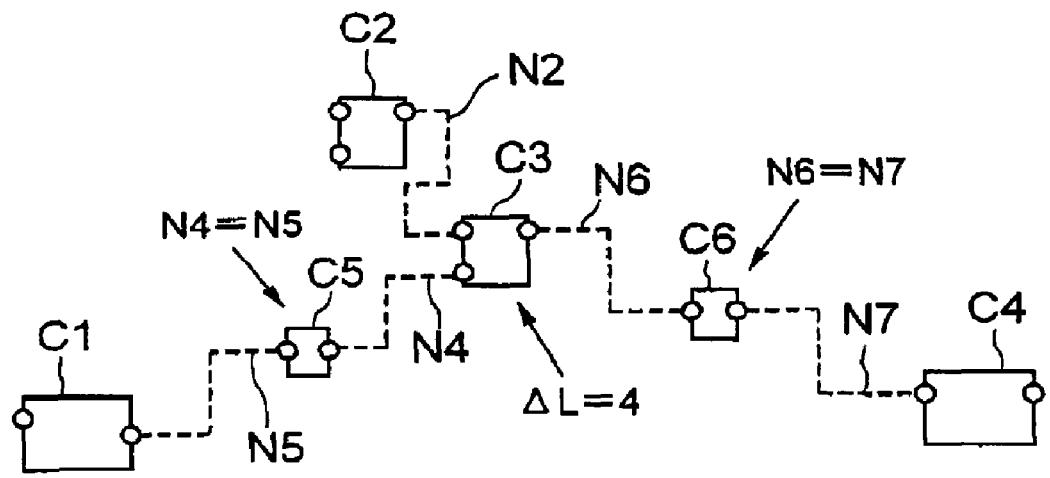
FIG. 11 is a circuit connection diagram showing a concrete example of layout change.

FIG. 11 shows a concrete example of the layout change. In step S17, the improvement-target cell C3 is moved to a free space such that the improvement-target net N2 will be shorter. The shift distance of the improvement-target cell C3 should fall within the range between "2" (minimum-cell-shift distance 134) and "6.75" (possible-cell-shift distance 133) and is set at "4", for example. Further, the repeater cells C5 and C6 are inserted into the nets (nets N1 and N3 of FIG. 9B) having an interconnect length that will be longer after relocation of the improvement-target cell C3, so as to equally divide both the nets N1 and N3 (i.e., N4=N5 and N6=N7). Further, as a matter of course, the inserted position of the repeater cells C5 and C6 is determined such that the sum of the interconnect lengths of the nets N4, N5 and nets N6, N7 after the division does not exceed the interconnect length of the net before the division.

FIG. 12 shows circuit-connection data 121 after the layout change. FIGS. 13A and 13B show layout/interconnect data 122 after the layout change. The layout change section 112 updates the circuit-connection data 121 and layout/interconnect data 122 in the layout change, to obtain the data as shown in FIGS. 12, 13A and 13B. As a result, it is possible to obtain a circuit that reduces the power dissipation while satisfying the timing constraint 125.

Figures 14, 15A, 15B:
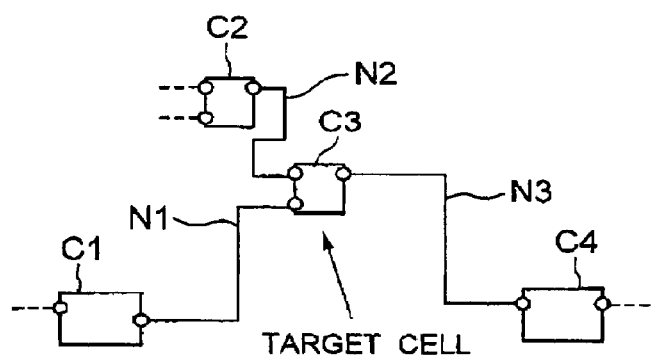
FIG. 14 is a circuit connection diagram showing a concrete example of layout change if repeater insertion is not performed.
FIG. 15A is a table showing the signal activity rate of respective nets after the layout change.
FIG. 15B is a table showing the power dissipation in respective sections after the layout change.

If it has been determined in step S12 that cell relocation is possible and, thereafter the process advances to step S17, the layout change section 112 refers to the possible-cell-shift distance 133 to perform relocation of the improvement-target cell 131 to thereby change the layout. FIG. 14 shows a concrete example of layout change if the process advances from step S12 to step S17. In this example, the improvement-target cell C3 is shifted to a free space within the range of the possible-cell-shift distance 133 such that the improvement-target net N2 will be shorter. Thereafter, redesign for the interconnect of the nets connected to the improvement-target cell 131 is performed and, then the layout/interconnect data 122 is updated.

After completion of the layout change, the process returns to step S3, where the power-dissipation calculation section 103 uses the layout/interconnect data 122 after the layout change to recalculate the power dissipation. Although the recalculation is performed in a manner similar to the manner of the calculation performed in step S3, it is not necessary to perform recalculation for a part that has not been changed by the layout change, and it is only necessary to recalculate a part that has been subjected to addition/modification. Further, if the circuit-connection data 121 has been updated by the layout change, the signal-activity-rate determination section 102 is used to calculate the signal activity rates 128 corresponding to respective nets in the circuit after the update.

FIG. 15A shows the signal activity rates 128 of respective nets after the layout change, and FIG. 15B shows the power dissipation in respective time intervals after the layout change. The signal-activity-rate determination section 102 uses the simulation pattern 127 shown in FIG. 5A to calculate the signal activity rates of the nets N2 and N4 to N7. As described above, since the nets N4 and N5 correspond to the net N1 before division, the signal activity rates thereof can be obtained from the waveform H1 shown in FIG. 5A. Similarly, the signal activity rates of the nets N6 and N7 can be obtained from the waveform H3 shown in FIG. 5A. When the cell power dissipation, net interconnect power dissipation, and total power dissipation are calculated for each time interval with reference to the calculated activity rates, a table shown in FIG. 15B is obtained.

After completion of the recalculation of the power dissipation, the process advances to step S4, where the excess-power-dissipation judgment section 104 compares the recalculated power dissipation 129 (FIG. 15B) and power dissipation limit 126 to determine whether or not violation of the power dissipation limit has occurred. If a violation of the power dissipation limit has occurred even after the layout change, the process advances to step S5, where another layout change is performed. If the power dissipation 129 is not more than the power dissipation limit 126, the process advances to step S18, where the layout/interconnect data output section 113 outputs the layout/interconnect data 122. In FIG. 15B, the total power dissipation exhibits the maximum value "8" in the time interval S2, which is the same as the value "8" of the power dissipation limit 126, so that the process advances to step S18, where the layout/interconnect data 122 is output.

Thus, if a reduction in the power dissipation is required, it is determined whether or not a reduction in the power dissipation is possible while assuming relocation of a specific cell. If the reduction is possible, it is determined whether or not a timing constraint violation has occurred due to the relocation of the specific cell; and if the reduction is possible and where the timing constraint is satisfied, the specific cell is relocated within the range within which the power dissipation can be reduced and the timing constraint can be satisfied to thereby achieve the layout change. As described above, in the present embodiment, improvement of the power dissipation and delay time can be achieved in a single layout modification process, thereby reducing the total processing time as compared to the conventional techniques in which layout modification needs to be done two times.

Further, if the timing constraint will not be unsatisfied if the specific cell is relocated for a reduction in the power dissipation, a repeater is inserted assuming the relocation of the specific cell and it is determined whether or not the timing constraint is satisfied. If the timing constraint is satisfied, a shift distance of the specific cell within which the reduction in the power dissipation is possible is calculated and the specific cell is relocated within the range within which the power dissipation can be reduced and timing constraint can be satisfied, to thereby achieve the layout change.

As described above, if only relocation of the specific cell cannot satisfy the timing constraint, repeater insertion is used together to thereby improve the power dissipation without involving deterioration of the propagation delay time, thereby achieving a higher reduction rate in the power dissipation than the conventional techniques.

As described with reference to the above embodiment, the layout design apparatus of the present invention may further includes a possible-cell-shift-distance recalculation section for recalculating a range of the possible shift distance of the improvement-target cell in the extracted signal path, by calculating a propagation delay time of the extracted signal path while assuming insertion of a repeater in a net of the extracted signal path having a longer expected interconnect length after the relocation of the improvement-target cell, if there is no overlapping range of shift distance between the specific shift distance and the possible shift distance, the recalculated range of the possible shift distance satisfying the specific delay constraint; and a minimum-cell-shift-resistance calculation section for calculating a minimum shift distance of the improvement-target cell within a range of shift distance satisfying a power dissipation lower than the power dissipation calculated by the power-dissipation calculation section, by calculating power dissipation of the semiconductor device based on the power dissipation library after relocation of the improvement-target cell and insertion of the repeater, if there is a range of shift distance in which the specific shift distance and the range of the possible shift distance calculated by the possible-cell-shift-distance recalculation section overlap each other, wherein the layout change section shifts the improvement-target cell within a range of shift distance between the minimum shift distance and an upper limit of the range of shift distance recalculated by the possible-cell-shift-distance recalculation section, if the minimum shift distance is smaller than the upper limit of the range of the shift distance, and inserts the repeater in the net having a longer expected interconnect length, thereby updating the circuit-connection data and the arrangement/interconnect data.

In addition, the layout design apparatus of the present invention may further includes an excess-power-dissipation judgment section for judging whether or not the power dissipation of the semiconductor device calculated by the power-dissipation calculation section exceeds a specified power dissipation, wherein the improvement-target-cell extraction section extracts the improvement-target cell if the excess-power-dissipation judgment section judges that the power dissipation calculated by the power-dissipation calculation section exceeds the specified power dissipation.

Further, in the layout design apparatus of the present invention, the improvement-target-cell extraction section may select an improvement-target net in an ascending order of the power dissipation from the nets in the circuit-connection data, and selects one of cells connected to the selected improvement-target net as the improvement-target cell.

Further, in the layout design apparatus of the present invention, the improvement-target-cell extraction section may select another cell among the cells connected to the improvement-target net for a next improvement-target cell if the power-dissipation-reduction-possibility judgment section judges that reduction in the power dissipation is impossible by relocation of the selected improvement-target cell.

Further, in the layout design apparatus of the present invention, the improvement-target-cell extraction section may select another cell among the cells connected to the improvement-target net for a next improvement-target cell if there is no range of shift distance in which the specific shift distance and the range of the possible shift distance calculated by the possible-cell-shift-distance recalculation section overlap each other for the selected improvement-target cell.

Further, in the layout design apparatus of the present invention, the improvement-target-cell extraction section my select another cell among the cells connected to the improvement-target net for a next improvement-target cell if the minimum shift distance is lager than the upper limit of the range of the shift distance for the selected improvement-target cell.

Further, in the layout design apparatus of the present invention, the improvement-target-cell extraction section may extract another net as a next improvement-target net after selecting all the cells connected to the selected improvement-target net.

Further, in the layout design apparatus of the present invention, the power-dissipation-reduction-possibility judgment section may assume relocation of the improvement-target cell in a direction such that the interconnect length of the improvement-target net has a smaller length after the relocation.

Further, in the layout design apparatus of the present invention, the possible-cell-shift-distance calculation section may assume relocation of the improvement-target cell in a direction such that the improvement-target net has a smaller interconnect length after the relocation.

Further, in the layout design apparatus of the present invention, the possible-cell-shift-distance calculation section may assume that relocation of the improvement-target cell increases the interconnect length of nets connected to the improvement-target cell other than the improvement-target net by a specific length, which is equal to a length reduced in the interconnect length of the improvement-target net.

Further, in the layout design apparatus of the present invention, the possible-cell-shift-distance recalculation section may assume relocation of the improvement-target cell in a direction such that the interconnect length of the improvement-target net has a smaller length after the relocation.

Further, in the layout design apparatus of the present invention, the possible-cell-shift-distance recalculation section may assume that relocation of the improvement-target cell increases the interconnect length of nets connected to the improvement-target cell other than the improvement-target net by a specific length, which is equal to a length reduced in the interconnect length of the improvement-target net.

Further, in the layout design apparatus of the present invention, the power-dissipation calculation section may calculate power dissipation of the nets and power dissipation of the cells, and obtains the power dissipation of the semiconductor device by adding both the power dissipations of the nets and the cells.

Further, in the layout design apparatus of the present invention, the power-dissipation calculation section may calculate the power dissipation, by referring to a simulation pattern having a waveform of a signal passing through each net in the circuit-connection data to determine a signal activity rate of the each net and calculating the power dissipation of the each net in a time interval for simulation based on the signal activity rate.

The above sections may be configured by hardware and/or software which runs on a computer to operate the computer for the specific processings.

Although the present invention has been described with reference to the preferred embodiment, the layout design apparatus, method thereof, and program thereof according to the present invention are not limited to the above embodiment, and a layout design apparatus, method thereof, and program thereof obtained by making various modifications and changes in the configurations of the above-described embodiment will fall within the scope of the present invention.

What is claimed is:

1. A layout design apparatus for designing layout of a semiconductor device, comprising:
   an input section for a receiving circuit-connection data including a plurality of cells in the semiconductor device and a plurality of nets connecting said cells, and an arrangement/interconnect data including an arrangement of said cells and an interconnect length of said nets;
   a power-dissipation calculation section for calculating a power dissipation of the semiconductor device based on said circuit-connection data, said arrangement/interconnect data, and a power dissipation library data including a power dissipation of a plurality of cells and a plurality of nets for use in the semiconductor device;
   an improvement-target-cell extraction section for extracting an improvement-target cell based on said circuit-connection data;
   a power-dissipation-reduction-possibility judgment section for judging whether a reduction in the power dissipation is possible by a relocation of said improvement-target cell in a specific shift distance, and assuming said relocation of said improvement-target cell and an associated change in said interconnect length in said arrangement/interconnect data and comparing power dissipations before and after said assumed relocation of said improvement-target cell, which are calculated by said power-dissipation calculation section,
   a path extracting section for extracting a signal path including said improvement-target cell based on said circuit-connection data after said power-dissipation-reduction-possibility judgment section judges that the reduction in power dissipation is possible;
   a possible-cell-shift-distance calculation section for calculating a possible shift distance of said improvement-target cell in said extracted signal path based on a delay library data of a plurality of cells and a plurality of nets for use in the semiconductor device, said possible shift distance satisfying a delay constraint specified for the semiconductor device; and
   a layout change section for relocating said improvement-target cell in said arrangement/interconnect data within a range of a shift distance in which said specific shift distance and said possible shift distance overlap each other, to update said arrangement/interconnect data.

2. The layout design apparatus according to claim 1, further comprising:
   a possible-cell-shift-distance recalculation section for recalculating a range of said possible shift distance of said improvement-target cell in said extracted signal path, by calculating a propagation delay time of said extracted signal path while assuming insertion of a repeater in a net of said extracted signal path having a longer expected interconnect length after said relocation of said improvement-target cell, if there is no overlapping range of shift distance between said specific shift distance and said possible shift distance, said recalculated range of said possible shift distance satisfying said specific delay constraint; and
   a minimum-cell-shift-resistance calculation section for calculating a minimum shift distance of said improvement-target cell within a range of shift distance satisfying a power dissipation lower than the power dissipation calculated by said power-dissipation calculation section, by calculating power dissipation of the semiconductor device based on said power dissipation library after relocation of said improvement-target cell and insertion of said repeater, if there is a range of shift distance in which said specific shift distance and said range of said possible shift distance calculated by said possible-cell-shift-distance recalculation section overlap each other, wherein said layout change section shifts said improvement-target cell within a range of shift distance between said minimum shift distance and an upper limit of said range of shift distance recalculated by said possible-cell-shift-distance recalculation section, if said minimum shift distance is smaller than said upper limit of said range of said shift distance, and inserts said repeater in said net having a longer expected interconnect length, thereby updating said circuit-connection data and said arrangement/interconnect data.

3. The layout design apparatus according to claim 1, further comprising an excess-power-dissipation judgment section for judging whether or not the power dissipation of the semiconductor device calculated by said power-dissipation calculation section exceeds a specified power dissipation, wherein said improvement-target-cell extraction section extracts said improvement-target cell if said excess-power-dissipation judgment section judges that the power dissipation calculated by said power-dissipation calculation section exceeds said specified power dissipation.

4. The layout design apparatus according to claim 2, wherein said improvement-target-cell extraction section selects an improvement-target net in an ascending order of the power dissipation from the nets in said circuit-connection data, and selects one of cells connected to said selected improvement-target net as said improvement-target cell.

5. The layout design apparatus according to claim 4, wherein said improvement-target-cell extraction section selects another cell among the cells connected to said improvement-target net for a next improvement-target cell if said power-dissipation-reduction-possibility judgment section judges that reduction in the power dissipation is impossible by relocation of said selected improvement-target cell.

6. The layout design apparatus according to claim 4, wherein said improvement-target-cell extraction section selects another cell among the cells connected to said improvement-target net for a next improvement-target cell if there is no range of shift distance in which said specific shift distance and said range of said possible shift distance calculated by said possible-cell-shift-distance recalculation section overlap each other for said selected improvement-target cell.

7. The layout design apparatus according to claim 4, wherein said improvement-target-cell extraction section selects another cell among the cells connected to said improvement-target net for a next improvement-target cell if said minimum shift distance is greater than said upper limit of said range of said shift distance for said selected improvement-target cell.

8. The layout design apparatus according to claim 4, wherein said improvement-target-cell extraction section extracts another net as a next improvement-target net after selecting all the cells connected to said selected improvement-target net.

9. The layout design apparatus according to claim 4, wherein said power-dissipation-reduction-possibility judgment section assumes a relocation of said improvement-target cell in a direction such that said interconnect length of said improvement-target net has a smaller length after said relocation.

10. The layout design apparatus according to claim 4, wherein said possible-cell-shift-distance calculation section assumes a relocation of said improvement-target cell in a direction such that said improvement-target net has a smaller interconnect length after said relocation.

11. The layout design apparatus according to claim 10, wherein said possible-cell-shift-distance calculation section assumes that relocation of said improvement-target cell increases said interconnect length of nets connected to said improvement-target cell other than said improvement-target net by a specific length, which is equal to a length reduced in said interconnect length of said improvement-target net.

12. The layout design apparatus according to claim 4, wherein said possible-cell-shift-distance recalculation section assumes a relocation of said improvement-target cell in a direction such that said interconnect length of said improvement-target net has a smaller length after said relocation.

13. The layout design apparatus according to claim 12, wherein said possible-cell-shift-distance recalculation section assumes that relocation of said improvement-target cell increases said interconnect length of nets connected to said improvement-target cell other than said improvement-target net by a specific length, which is equal to a length reduced in said interconnect length of said improvement-target net.

14. The layout design apparatus according to claim 1, wherein said power-dissipation calculation section calculates a power dissipation of said nets and power dissipation of said cells, and obtains the power dissipation of the semiconductor device by adding both said power dissipations of said nets and said cells.

15. The layout design apparatus according to claim 14, wherein said power-dissipation calculation section calculates the power dissipation, by referring to a simulation pattern having a waveform of a signal passing through each net in said circuit-connection data to determine a signal activity rate of said each net and calculating the power dissipation of said each net in a time interval for simulation based on said signal activity rate.

16. A method for designing layout of a semiconductor device in a computer system, comprising the steps of:
receiving, by a computer, a circuit-connection data including a plurality of cells in the semiconductor device and a plurality of nets connecting said cells, and an arrangement/interconnect data including an arrangement of said cells and an interconnect length of said nets;
calculating a power dissipation of the semiconductor device based on said circuit-connection data, said arrangement/interconnect data, and power dissipation library data including a power dissipation of a plurality cells and a plurality of nets for use in the semiconductor device;
extracting an improvement-target cell based on said circuit-connection data;
judging whether a reduction in the power dissipation is possible by a relocation of said improvement-target cell in a specific shift distance, and assuming said relocation of said improvement-target cell and an associated change in said interconnect length in said arrangement/interconnect data and comparing power dissipations before and after said assumed relocation of said improvement-target cell, which are calculated in said power dissipation calculating step;

extracting a signal path including said improvement-target cell based on said circuit-connection data after said judging step judges that the reduction in power dissipation is possible;

calculating a possible shift distance of said improvement-target cell in said extracted signal path based on a delay library data of a plurality of cells and a plurality of nets for use in the semiconductor device, said possible shift distance satisfying a delay constraint specified for the semiconductor device; and relocating said improvement-target cell in said arrangement/interconnect data within a range of a shift distance in which said specific shift distance and said possible shift distance overlap each other, to update said arrangement/interconnect data.

17. The method according to claim 16, further comprising:

recalculating a range of said possible shift distance of said improvement-target cell in said extracted signal path, by calculating a propagation delay time of said extracted signal path while assuming insertion of a repeater in a net of said extracted signal path having a longer expected interconnect length after said relocation of said improvement-target cell if there is no overlapping range of shift distance between said specific shift distance and said possible shift distance, said range of said possible shift distance satisfying said specific delay constraint; and calculating a minimum shift distance of said improvement-target cell within a range of shift distance satisfying a power dissipation lower than the power dissipation calculated by said power-dissipation calculation section, by calculating power dissipation of the semiconductor device based on said power dissipation library after relocation of said improvement-target cell and insertion of said repeater, if there is a range of shift distance in which said specific shift distance and said range of said calculated possible shift distance overlap each other, wherein said layout changing step shifts said improvement-target cell within a range of shift distance between said minimum shift distance and an upper limit of said range of shift distance recalculated by said recalculating section, if said minimum shift distance is smaller than said upper limit of said range of said shift distance, and inserts said repeater in said net having a longer expected interconnect length, thereby updating said circuit-connection data and said arrangement/interconnect data.

18. The method according to claim 16, further comprising the step of judging whether or not the power dissipation of the semiconductor device calculated by said power dissipation calculating step exceeds a specified power dissipation, wherein said improvement-target cell extracting step extracts said improvement-target cell if the power dissipation calculated by said power-dissipation calculating step exceeds said specified power dissipation.

19. The method according to claim 17, wherein said improvement-target-cell extracting step selects an improvement-target net in an ascending order of the power dissipation from the nets in said circuit-connection data, and selects one of cells connected to said selected improvement-target net as said improvement-target cell.

20. The method according to claim 19, wherein said improvement-target-cell extracting step selects another cell among the cells connected to said improvement-target net as a next improvement-target cell if a reduction in the power dissipation is impossible by relocation of said selected improvement-target cell.

21. The method according to claim 19, wherein said improvement-target-cell extracting step selects another cell among the cells connected to said improvement-target net as a next improvement-target cell if there is no range of shift distance in which said specific shift distance and said range of said possible shift distance calculated by said recalculating step overlap each other for said selected improvement-target cell.

22. The method according to claim 19, wherein said improvement-target-cell extracting step selects another cell among the cells connected to said improvement-target net as a next improvement-target cell if said minimum shift distance is greater than said upper limit of said range of said shift distance for said selected improvement-target cell.

23. The method according to claim 19, wherein said improvement-target-cell extracting step extracts another net as a next improvement-target net after selecting all the cells connected to said selected improvement-target net.

24. The method according to claim 19, wherein said judging step assumes a relocation of said improvement-target cell in a direction such that said interconnect length of said improvement-target net has a smaller length after said relocation.

25. The method according to claim 19, wherein said possible-cell-shift-distance calculating step assumes a relocation of said improvement-target cell in a direction such that said improvement-target net has a smaller interconnect length after said relocation.

26. The method according to claim 25, wherein said possible-cell-shift-distance calculating step assumes that relocation of said improvement-target cell increases said interconnect length of nets connected to said improvement-target cell other than said improvement-target net by a specific length, which is equal to a length reduced in said interconnect length of said improvement-target net.

27. The method according to claim 19, wherein said recalculating step assumes a relocation of said improvement-target cell in a direction such that said interconnect length of said improvement-target net has a smaller length after said relocation.

28. The method according to claim 27, wherein said recalculating step assumes that relocation of said improvement-target cell increases said interconnect length of nets connected to said improvement-target cell other than said improvement-target net by a specific length, which is equal to a length reduced in said interconnect length of said improvement-target net.

29. The method according to claim 16, wherein said power-dissipation calculating step calculates a power dissipation of said nets and power dissipation of said cells, and obtains the power dissipation of the semiconductor device by adding both said power dissipations of said nets and said cells.

30. The method according to claim 29, wherein said power-dissipation calculating step calculates the power dissipation, by referring to a simulation pattern having a waveform of a signal passing through each net in said circuit-connection data to determine a signal activity rate of said each net and calculating the power dissipation of said each net in a time interval for simulation based on said signal activity rate.

31. A programmable storage medium tangibly embodying a program of machine-readable instructions executable by a digital processing apparatus to perform a method of mapping an event, said method comprising:

receiving a circuit-connection data including a plurality of cells in the semiconductor device and a plurality of nets connecting said cells, and an arrangement/interconnect data including an arrangement of said cells and an interconnect length of said nets;

calculating a power dissipation of the semiconductor device based on said circuit-connection data, said arrangement/interconnect data, and a power dissipation library data including a power dissipation of a plurality of cells and a plurality of nets for use in the semiconductor device;

extracting an improvement-target cell based on said circuit-connection data;

judging whether a reduction in power dissipation is possible by a relocation of said improvement-target cell in a specific shift distance, and assuming said relocation of said improvement-target cell and an associated change in said interconnect length in said arrangement/interconnect data and comparing power dissipations before and after said assumed relocation of said improvement-target cell, which are calculated in said power dissipation calculating step, extracting a signal path including said improvement-target cell based on said circuit-connection data after said judging that the reduction in power dissipation is possible;

calculating a possible shift distance of said improvement-target cell in said extracted signal path based on a delay library data of a plurality of cells and a plurality of nets for use in the semiconductor device, said possible shift distance satisfying a delay constraint specified for the semiconductor device; and relocating said improvement-target cell in said arrangement/interconnect data within a range of a shift distance in which said specific shift distance and said possible shift distance overlap each other, to update said arrangement/interconnect data.

* * * * *